(12) United States Patent
Gedcke et al.

(10) Patent No.: US 9,878,404 B2
(45) Date of Patent: Jan. 30, 2018

(54) CONDENSATION MANAGEMENT SYSTEM, A FURNACE INCLUDING THE SAME AND A CONDENSATION COLLECTION BOX

(75) Inventors: Jeff P. Gedcke, Gilbert, SC (US); George L. Joyner, Jr., Florence, SC (US); Glenn W. Kowald, Carrollton, TX (US); Hans J. Paller, Double Oak, TX (US)

(73) Assignee: Lennox Industries Inc., Richardson, TX (US)

( * ) Notice: Subject to any disclaimer, the term of this patent is extended or adjusted under 35 U.S.C. 154(b) by 992 days.

(21) Appl. No.: 12/834,611

(22) Filed: Jul. 12, 2010

(65) Prior Publication Data

US 2011/0174202 A1 Jul. 21, 2011

Related U.S. Application Data

(60) Provisional application No. 61/295,501, filed on Jan. 15, 2010.

(51) Int. Cl.
*F24H 3/00* (2006.01)
*F24H 3/06* (2006.01)
(Continued)

(52) U.S. Cl.
CPC .............. *B23P 15/00* (2013.01); *B29C 45/18* (2013.01); *F23D 14/34* (2013.01); *F23D 14/58* (2013.01); *F24H 3/087* (2013.01); *F24H 8/006* (2013.01); *F24H 9/2035* (2013.01); *F25D 21/14* (2013.01); *B29L 2031/18* (2013.01); *F23D 2900/14481* (2013.01); *Y02B 30/106* (2013.01); *Y10T 29/49* (2015.01); *Y10T 29/4935* (2015.01); *Y10T 29/49348* (2015.01); *Y10T 29/49389* (2015.01); *Y10T 29/49826* (2015.01); *Y10T 137/4463* (2015.04)

(58) Field of Classification Search
CPC ...................................................... B23R 15/00
USPC ...... 126/99 R, 108, 109, 116 R, 99 A, 110 R
See application file for complete search history.

(56) References Cited

U.S. PATENT DOCUMENTS 4,309,947 A * 1/1982 Ketterer ................. F24H 8/006
110/203
4,309,977 A 1/1982 Kitchen
(Continued)

FOREIGN PATENT DOCUMENTS

CN 201203263 3/2009
EP 0596555 A1 5/1994
(Continued)

*Primary Examiner* — Avinash Savani
*Assistant Examiner* — George R Blum

(57) ABSTRACT

A condensation management system, a furnace having the condensation management system and a cold end header box employable in the condensation management system are disclosed herein. In one embodiment, the condensation management system includes: (1) a first drain hose positioned to drain flue condensation from a flue pipe of the furnace, (2) a second drain hose positioned to drain the flue condensation from the flue pipe and (3) a condensation collector box configured to collect both the flue condensation and combustion condensation from a heat exchanger of the furnace, the condensation collector box including at least one drain for draining both the flue condensation and the combustion condensation therefrom.

19 Claims, 6 Drawing Sheets

(51) Int. Cl.
*F24H 9/20* (2006.01)
*B23P 15/00* (2006.01)
*F23D 14/58* (2006.01)
*F23D 14/34* (2006.01)
*F24H 3/08* (2006.01)
*F24H 8/00* (2006.01)
*B29C 45/18* (2006.01)
*F25D 21/14* (2006.01)
*B29L 31/18* (2006.01)

(56) References Cited

U.S. PATENT DOCUMENTS

| | | | | |
|---|---|---|---|---|
| 4,481,935 A | * | 11/1984 | Bawel | F23J 13/04 |
| | | | | 126/307 R |
| 4,603,680 A | * | 8/1986 | Dempsey | F23J 13/04 |
| | | | | 126/109 |
| 4,622,947 A | * | 11/1986 | Hays et al. | 126/110 R |
| 5,313,930 A | * | 5/1994 | Kujawa et al. | 126/116 R |
| 5,320,087 A | * | 6/1994 | Froman | 126/110 R |
| 5,322,050 A | | 6/1994 | Lu | |
| 5,347,980 A | * | 9/1994 | Shellenberger | F24H 3/087 |
| | | | | 126/110 R |
| 5,375,586 A | * | 12/1994 | Schumacher | F24H 8/006 |
| | | | | 126/110 R |
| 5,448,986 A | * | 9/1995 | Christopher | F24H 3/105 |
| | | | | 126/110 R |
| 5,582,159 A | * | 12/1996 | Harvey | F24H 8/006 |
| | | | | 126/110 R |
| 5,623,918 A | * | 4/1997 | Swilik et al. | 126/110 R |
| 5,704,343 A | | 1/1998 | Ahn et al. | |
| 5,749,355 A | * | 5/1998 | Roan | F24H 3/105 |
| | | | | 126/110 R |
| 5,775,318 A | * | 7/1998 | Haydock | F24H 3/087 |
| | | | | 126/110 R |
| 5,799,646 A | | 9/1998 | Zia et al. | |
| 7,036,498 B2 | * | 5/2006 | Riepenhoff | F24H 8/006 |
| | | | | 126/110 R |
| 8,056,553 B2 | * | 11/2011 | Khan | F24H 3/087 |
| | | | | 126/110 R |
| 8,393,318 B2 | * | 3/2013 | Khan | F24H 3/087 |
| | | | | 126/114 |
| 8,683,993 B2 | | 4/2014 | Paller et al. | |
| 9,038,622 B2 | | 5/2015 | Goundiah Ramasamy | F24H 8/006 |
| | | | | 126/85 R |
| 2005/0126558 A1 | * | 6/2005 | Riepenhoff | F24H 8/006 |
| | | | | 126/110 R |
| 2008/0314375 A1 | | 12/2008 | Khan | |
| 2009/0044793 A1 | | 2/2009 | Khan et al. | |
| 2011/0174291 A1 | * | 7/2011 | Manohar | F23C 3/002 |
| | | | | 126/112 |
| 2011/0174461 A1 | * | 7/2011 | Kowald | F24H 3/087 |
| | | | | 165/59 |
| 2011/0174471 A1 | * | 7/2011 | Paller | F24H 3/087 |
| | | | | 165/173 |
| 2011/0174891 A1 | * | 7/2011 | Kowald | F23L 1/00 |
| | | | | 237/53 |
| 2011/0177465 A1 | * | 7/2011 | Paller | F24H 3/087 |
| | | | | 431/350 |
| 2012/0055465 A1 | * | 3/2012 | Khan | F24H 3/087 |
| | | | | 126/99 R |
| 2012/0090591 A1 | | 4/2012 | Rieke et al. | |
| 2014/0020669 A1 | * | 1/2014 | Sherrow | F24H 9/0068 |
| | | | | 126/110 C |
| 2014/0034038 A1 | * | 2/2014 | Sherrow | F24H 3/08 |
| | | | | 126/116 R |
| 2014/0202443 A1 | * | 7/2014 | Sherrow | F24H 9/0068 |
| | | | | 126/116 R |

FOREIGN PATENT DOCUMENTS

| | | | | |
|---|---|---|---|---|
| EP | 2354707 A2 | * | 8/2011 | ............ F24H 3/087 |
| FR | 2581735 A1 | | 11/1986 | |
| JP | 56020908 | | 2/1981 | |

\* cited by examiner

CONDENSATION MANAGEMENT SYSTEM, A FURNACE INCLUDING THE SAME AND A CONDENSATION COLLECTION BOX

CROSS-REFERENCE TO RELATED APPLICATION

This application claims the benefit of U.S. Provisional Application Ser. No. 61/295,501, filed by Shailesh S. Manohar, et al., on Jan. 15, 2010, entitled "An Improved Heating Furnace for a HVAC System," and incorporated herein by reference.

TECHNICAL FIELD

This application is directed, in general, to furnaces and, more specifically, to removing condensation from furnaces.

BACKGROUND

HVAC systems can be used to regulate the environment within an enclosure. Typically, an air blower is used to pull air from the enclosure into the HVAC system through ducts and push the air back into the enclosure through additional ducts after conditioning the air (e.g., heating or cooling the air). For example, a furnace, such as a gas furnace may be used to heat the air.

High efficiency gas-fired appliances including residential furnaces typically rely on a mechanical means, such as a combustion air inducer, to create controlled mass flow thru the flue side of the furnace heat exchanger. As the heated air flows therethrough, condensation is formed. To prevent damage to furnace components, such as a pressure sensing devices, the condensation is collected and removed from the furnace. This may be particularly evident with condensing or high efficiency (>90% AFUE) furnaces where the removal of condensation generated during the combustion process is needed.

SUMMARY

In one aspect, the disclosure provides a condensation management system for a furnace. In one embodiment, the condensation management system includes: (1) a first drain hose positioned to drain flue condensation from a flue pipe of the furnace, (2) a second drain hose positioned to drain the flue condensation from the flue pipe and (3) a condensation collector box configured to collect both the flue condensation and combustion condensation from a heat exchanger of the furnace, the condensation collector box including at least one drain for draining both the flue condensation and the combustion condensation therefrom.

In another aspect, a furnace is disclosed. In one embodiment, the furnace includes: (1) a heat exchanger, (2) a combustion air inducer configured to generate air flow through the heat exchanger, (3) a flue pipe configured to vent gas from the furnace and (4) a condensation management system including: (4A) a first drain hose positioned to drain flue condensation from the flue pipe, (4B) a second drain hose positioned to drain the flue condensation and (4C) a condensation collector box configured to collect both the flue condensation and combustion condensation from the heat exchanger, the condensation collector box including at least one drain for draining both the flue condensation and the combustion condensation therefrom.

In yet another aspect, a CEHB is disclosed. In one embodiment, the CEHB includes: (1) a front having a fixed orifice configured to regulate gas flow through a heat exchanger of the furnace, the front coupled to first, second, third and fourth sides that extend from the front in a first direction, (2) a first drain coupled to the first side at an opening thereof located proximate the second side, the first drain extending from the first side along an axis parallel with the second and third sides, (3) a second drain coupled to the fourth side at an opening thereof located proximate the second side, the second drain extending from the fourth side along the axis parallel with the second and third sides, (4) a first drain port coupled to the front proximate the second side and (5) a second drain port coupled to the first drain, wherein the first drain port and the second drain port extend in a second direction that is generally opposite the first direction.

BRIEF DESCRIPTION

Reference is now made to the following descriptions taken in conjunction with the accompanying drawings, in which.

DETAILED DESCRIPTION

To prevent build-up of the condensation and protect monitoring equipment of the furnace, for example pressure sensing devices, proper drainage of the condensation is needed. Conventional furnaces may require multiple pressure sensing devices or require relocating the pressure sensing devices when a furnace is used in different positions in order to properly sense water build-up (under blocked drain conditions) and protect the sensing devices from condensation. Additionally, rerouting of hoses used for drainage or for sensing pressure may also have to be relocated when a furnace is installed at different positions.

Accordingly, disclosed herein is a condensation management system that collects condensation from both a furnace heat exchanger and flue (vent) pipe of the furnace into a single collection box from which the condensation can then drain from the furnace. A flow restriction orifice located at the drain ports of the collection box that receive the drain hoses from the flue pipe of the furnace is employed to meter the amount of flue gas bypass back to the collector box. The disclosed condensation management system can be used on a single or multiple position furnace.

Conventional furnace designs may separately drain condensation generated in the flue (vent) pipe (i.e., flue condensation) and the condensation generated in the furnace heat exchanger (i.e., combustion condensation). Separately draining the flue condensation and the combustion condensation typically requires a larger, dual pressure chamber condensation trap and multiple safety pressure switches to shut down the furnace in the event of an abnormal operating condition. In addition, having multiple safety pressure switches also can require that components be relocated at installation (depending on the desire unit configuration) increasing the likelihood of errors.

Advantageously, the disclosed condensation management system reduces the number of safety pressure switches that are typically needed. The collection box that is disclosed includes a positive pressure channel and a negative pressure channel that are configured to allow the measurement of combustion pressure to respond to abnormal condensate levels. Additionally, the disclosed system eliminates the rerouting of condensation and pressure switch hoses at installation and provides a negative pressure trap that eliminates or at least greatly reduces the possibility of flue product leakage into an enclosed space, such as a home, when a dry (not primed trap) condition exists. A smaller trap design is also possible. All of these features of the disclosed system offer a combination of reduced product cost, simplified product installation and increased furnace safety.

Figure 1:
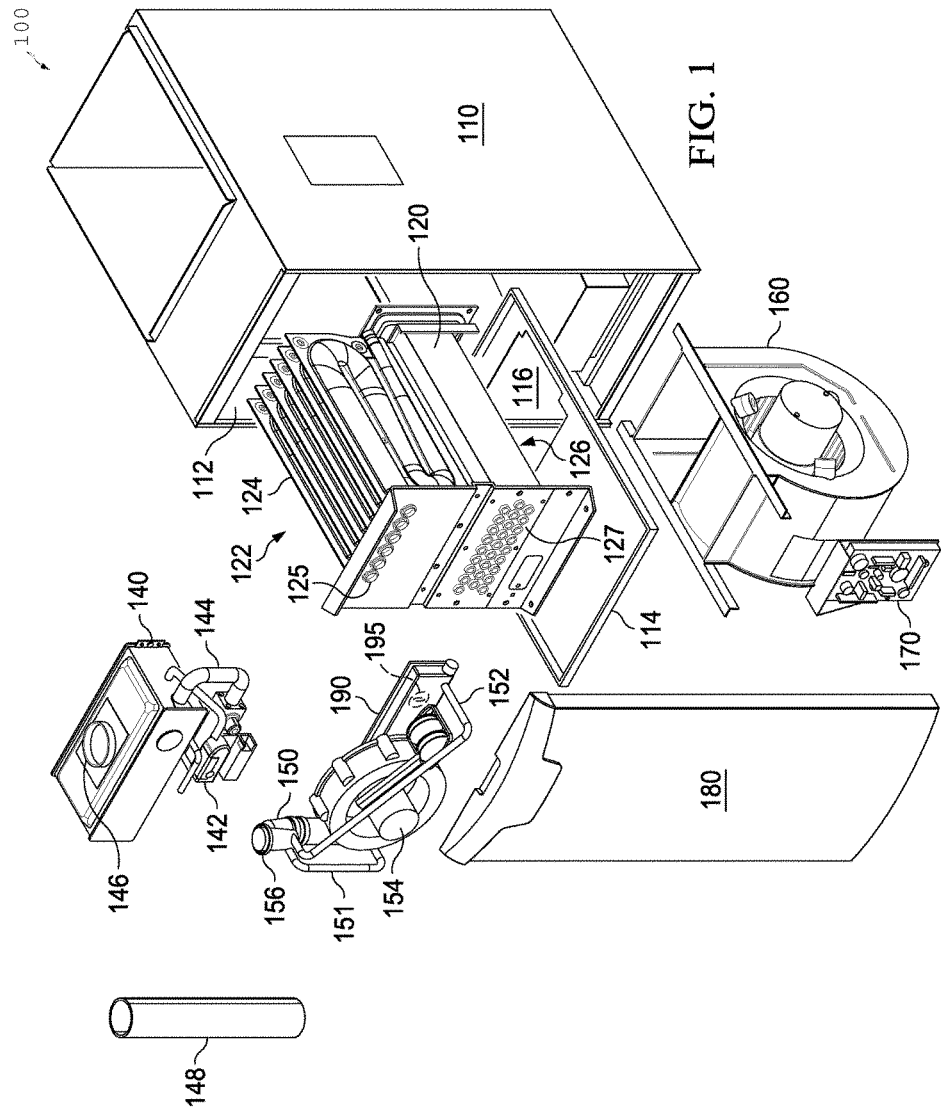
FIG. 1 is an exploded isometric view of a portion of an embodiment of a furnace constructed according to the principles of the disclosure.

Turning now to FIG. 1, illustrated is an exploded isometric view of a portion of an embodiment of a furnace 100 constructed according to the principles of the disclosure. The furnace 100 may be a multi-position furnace. In some embodiments, the furnace may be a residential gas furnace. The furnace 100 includes an embodiment of a header box that is used for collecting condensation generated in the furnace 100. The furnace 100 also includes a condensation management system that includes the header box.

The furnace 100 includes a housing 110 having a front opening 112 within which a mounting shelf 114 is located. The mounting shelf 114 has an opening 116 therein and supports a heat exchanger assembly 120 over the opening 116. The heat exchanger assembly 120 includes a primary heat exchanger 122 and a secondary heat exchanger 126. The primary heat exchanger 122 includes a row of six heat exchangers (one referenced as 124) coupled to one another. The heat exchangers are generally serpentine and have three approximately 180° folds such that the heat exchangers cross over the opening 116 four times, terminating in inlets 125 (of the primary heat exchanger 122) and outlets 127 (of the secondary heat exchanger 126) that are generally mutually coplanar and oriented toward the opening 112 of the housing 110. Alternative embodiments of the heat exchanger assembly 120 may have more or fewer heat exchangers coupled to one another in one or more rows. Additionally, alternative embodiments may have alternative heat exchanger configurations.

A burner assembly 140 contains an electronically-controlled solenoid valve 142, a manifold 144 leading from the valve 142 and across the burner assembly 140, one or more gas orifices (not shown) coupled to the manifold 144 and one or more burners (not shown) corresponding to and located proximate the gas orifices. The illustrated embodiment of the burner assembly 140 has a row of six burners. Alternative embodiments of the burner assembly 140 may have more or fewer burners arranged in one or more rows. A combustion air inlet 146 allows air in for the burner assembly 140. In an assembled configuration, the burner assembly 140 is located proximate the heat exchanger assembly 120 such that the burners thereof at least approximately align with the inlets 125.

The furnace 100 also includes a draft inducer assembly 150 having a combustion air inducer 154 and a combustion flue collar 156 coupled to an outlet of the combustion air inducer 154. In an assembled configuration, the draft inducer assembly 150 is located proximate the heat exchanger assembly 120 such that the combustion flue collar 156 approximately aligns with a flue pipe 148 that directs undesired gases (e.g., gaseous products of combustion) away from the furnace 100. Associated with the draft inducer assembly 150 are first and second drain hoses, 151, 152, that provide a path to drain flue condensation from the flue pipe 148 and the combustion flue collar 156. The combustion flue collar 156 includes first and second drainage export ports that are not visible in FIG. 1 but are configured to receive the first and second drain hoses 151, 152, and allow the flue condensation to flow therethrough. The first and second drain hoses 151, 152, may be conventional devices that are used in furnaces to carry liquids such as water.

A blower 160 is suspended from the shelf 114 such that an outlet (not referenced) thereof approximately aligns with the opening 116. An electronic controller 170 is located proximate the blower 160 and is configured to control the blower, the valve 142 and the combustion air inducer 154 to cause the furnace to provide heat. A cover 180 may be placed over the front opening 112 of the housing 110.

A CEHB 190 provides an interface between the combustion air inducer 154 and the secondary heat exchanger 126. The combustion air inducer 154 has an inlet coupled to the CEHB 190. In an assembled configuration, the draft inducer assembly 150 is located proximate the heat exchanger assembly 120 such that the CEHB 190 approximately aligns with the outlets 127 and the combustion flue collar 156 approximately aligns with the flue pipe 148.

The furnace 100 also includes a pressure sensing device 195 that is configured to monitor the combustion pressure through the heat train of the furnace 100. The pressure sensing device 195 may be mechanical differential pressure sensing device (such as a pressure switch) or an electronic sensor which provide feedback to an integrated electronic controller of the furnace 100, such as the electronic controller 170. The pressure sensing device 195 includes inputs for determining the combustion pressure (which verifies proper flow through the heat exchanger). The inputs of the pressure sensing device 195 are coupled to pressure ports of the CEHB 190. The pressure sensing device 195 may be fastened to the ports of the CEHB 190 through conventional hoses. Additionally, the pressure sensing device 195 may be coupled to the electronic controller 170 or the valve 142 through conventional means. In some embodiments, the pressure sensing device 195 may be fastened to the CEHB 190.

In the illustrated embodiment, the controller 170 turns on the combustion air inducer 154 to initiate a draft in the heat exchangers (including the heat exchanger 124) and purge potentially harmful unburned or combustion gases. Then the controller 170 opens the valve 142 to admit gas to the manifold 144 and the one or more gas orifices, whereupon the gas begins to mix with air to form a combustible mixture. Then the controller 170 activates an igniter (not shown in FIG. 1) to attempt to ignite the combustible mixture. If the output of a flame rectification circuit indicates that the combustible mixture has not ignited within a predetermined period of time, the controller 170 then closes the valve 142 and waits until attempting to start again. If the output of the flame rectification circuit indicates that the combustible mixture has ignited within the predetermined period of time, the controller 170 then activates the blower 160, which forces air upward through the opening 116 and the heat exchanger assembly 120. As it passes over the surfaces of the heat exchangers, the air is warmed, whereupon it may be delivered or distributed as needed to provide heating.

Figure 2:
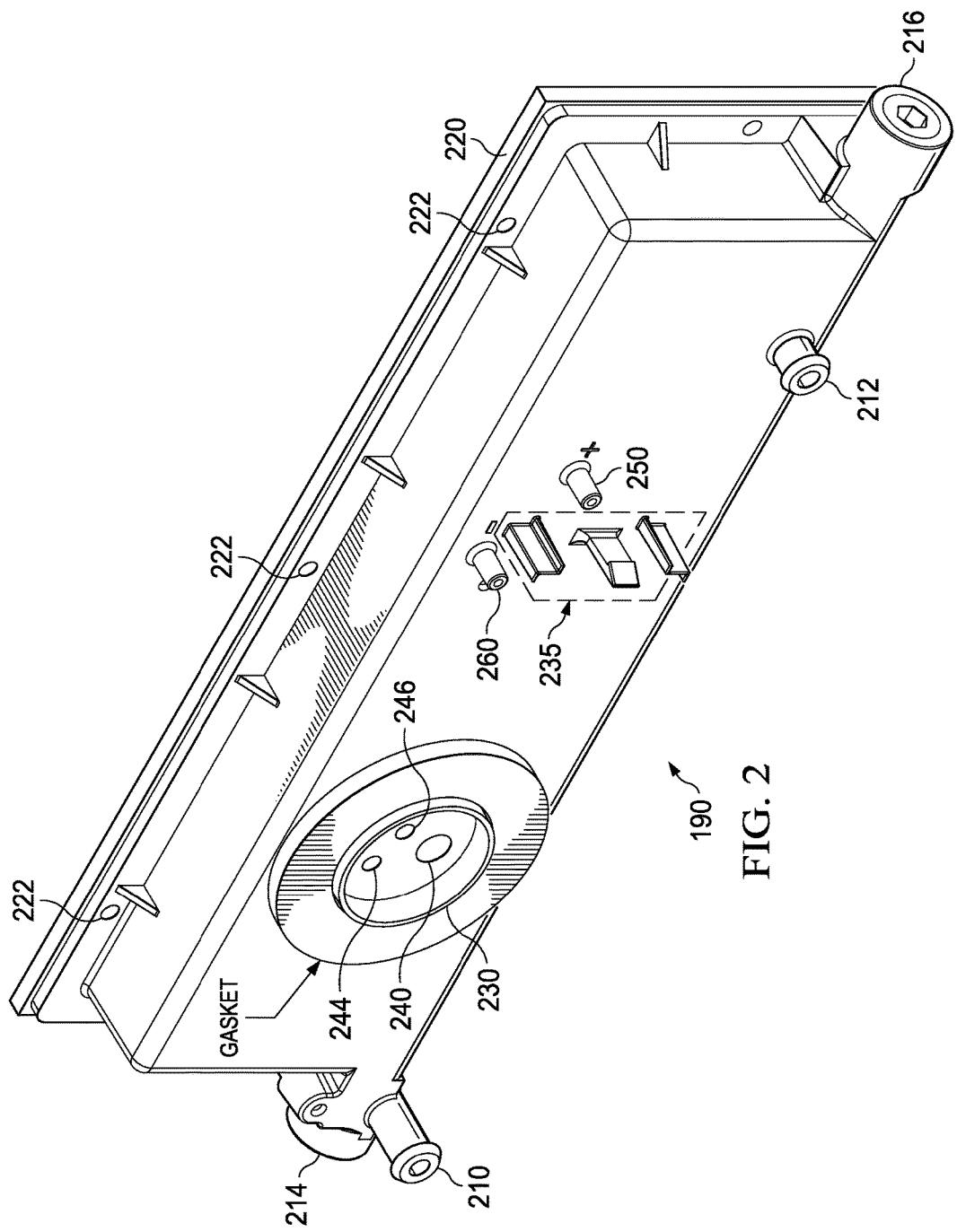
FIG. 2 is a front isometric view of an embodiment of a condensation collector box constructed according to the principles of the disclosure.
Figure 3:
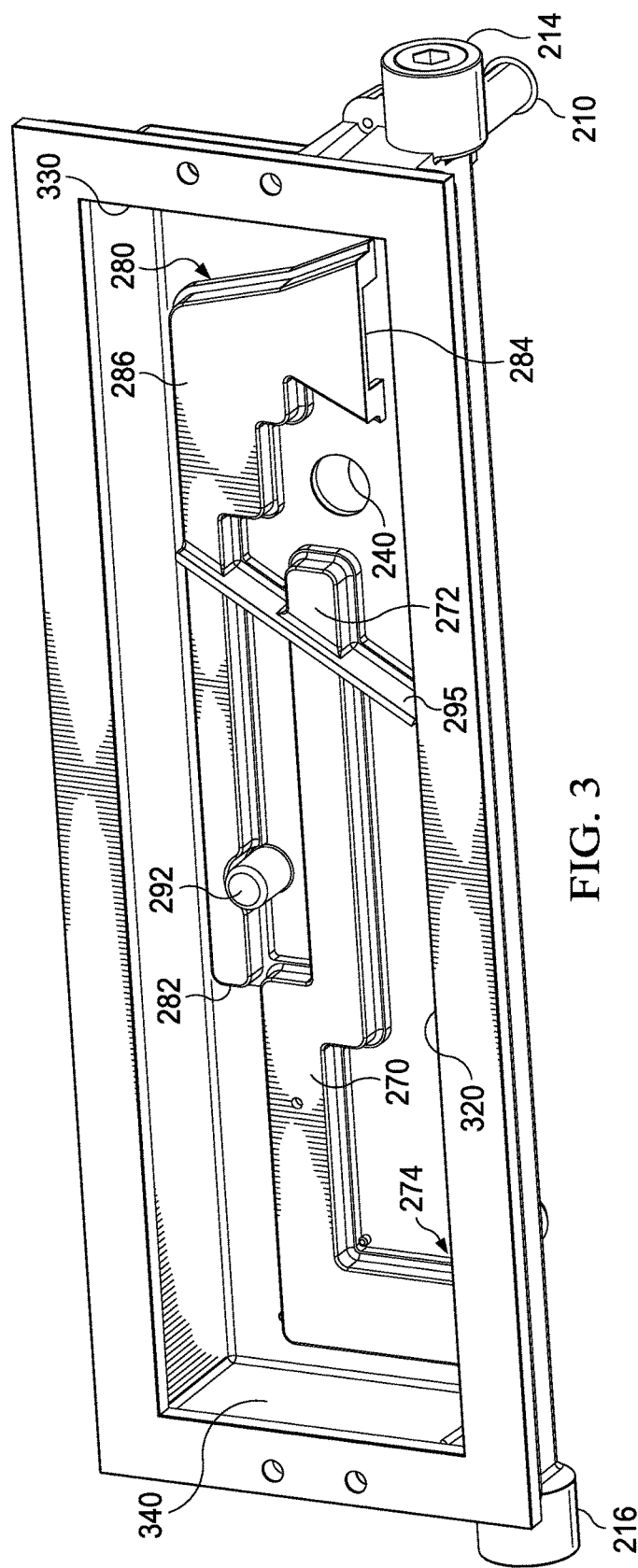
FIG. 3 is a rear isometric view of the condensation collector box of FIG. 2.
Figure 4:
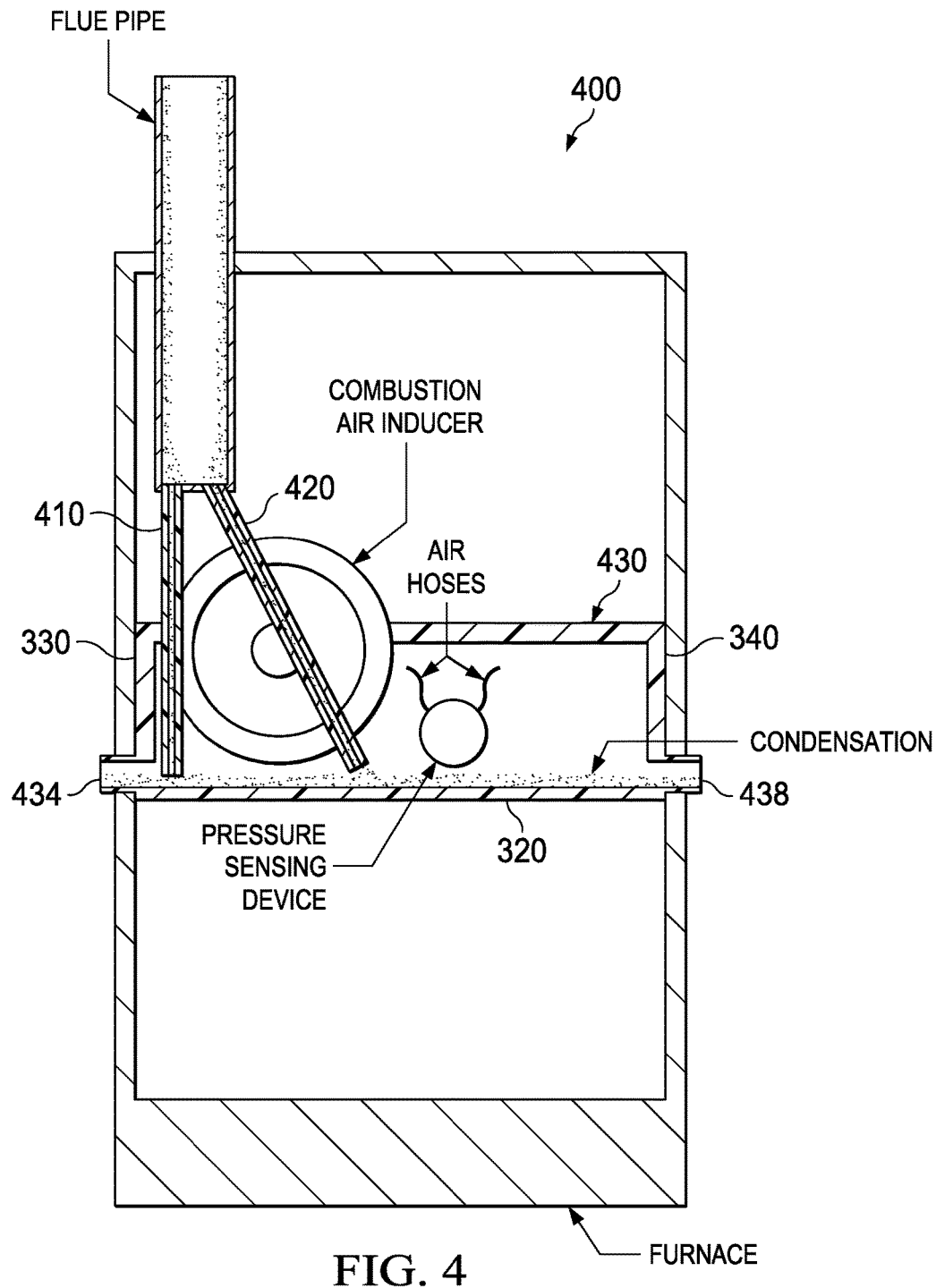
FIG. 4 is a functional view of an embodiment of a condensation collector box constructed according to the principles of the disclosure showing normal operation when installed in an upright positioned furnace.
Figure 5:
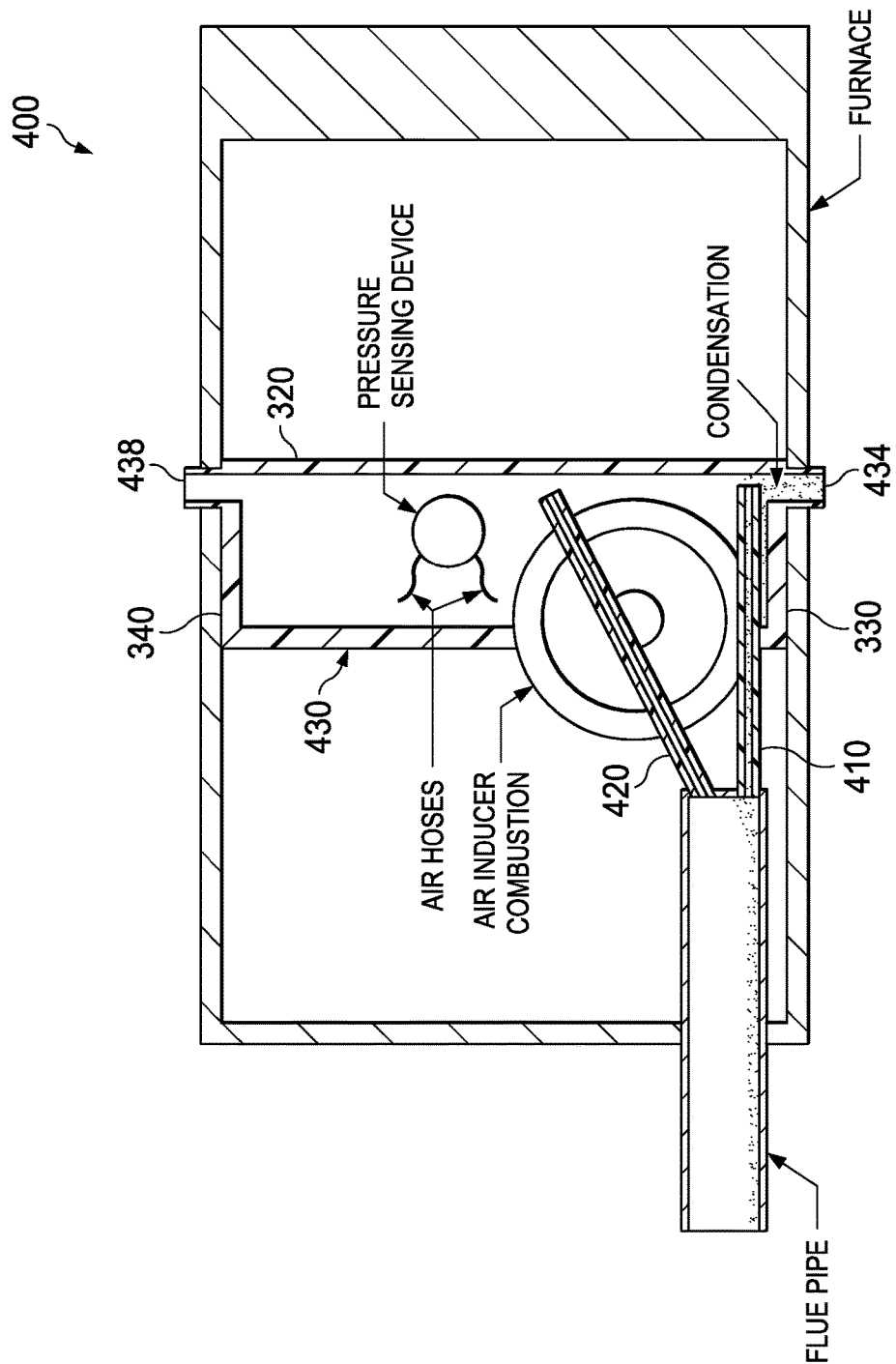
FIG. 5 is a functional view of the condensation collector box in FIG. 4 when installed in a horizontal left position.
Figure 6:
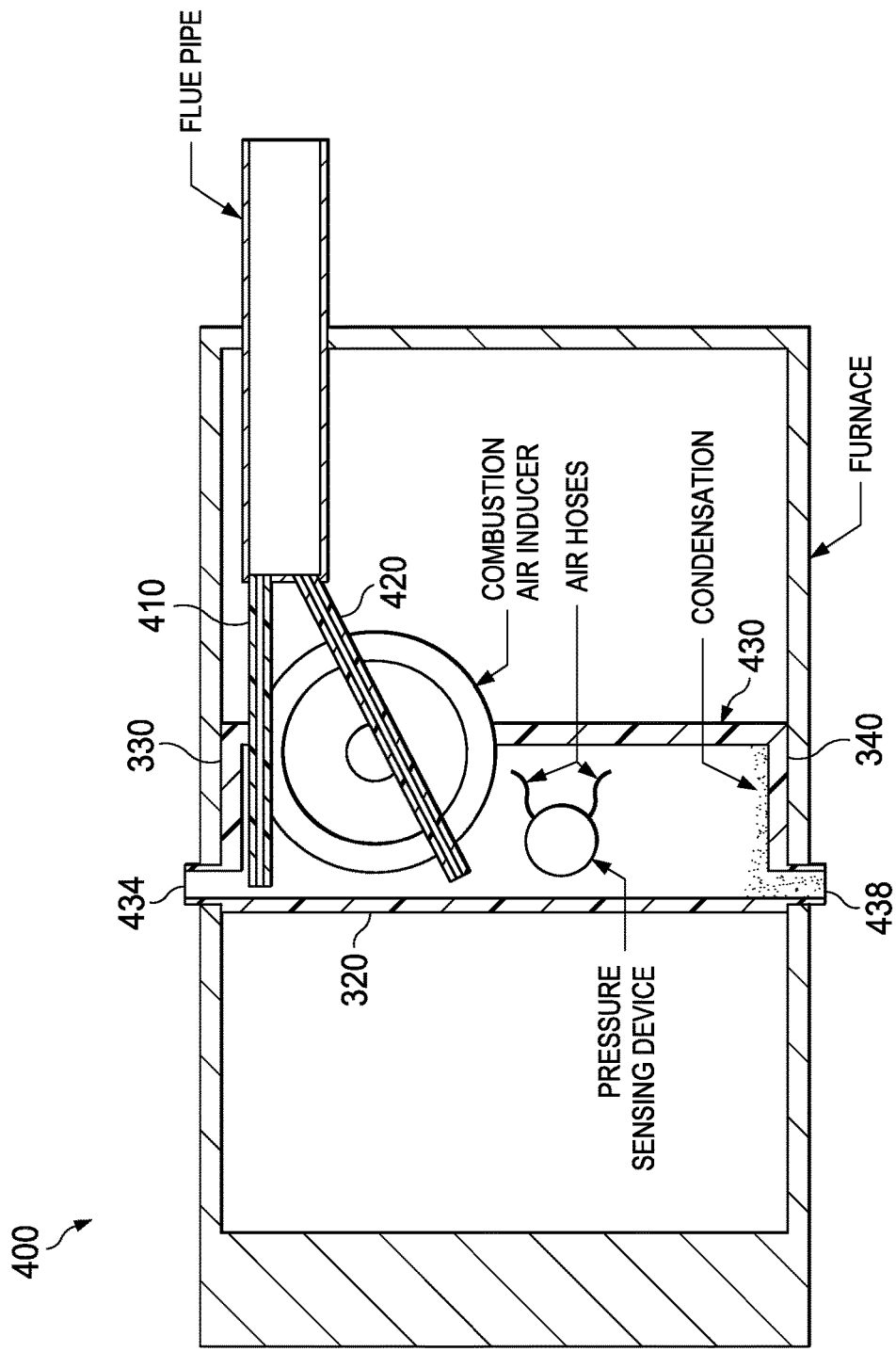
FIG. 6 is a functional view of the condensation collector box in FIG. 4 when installed in a horizontal right position.

As the undesired products of combustion are exhausted through the flue pipe 148 via the combustion flue collar 156, flue condensation forms along the flue collar 156 and the flue pipe 148. Additionally, as heated gases flow through the CEHB 190 from the heat exchanger 120, combustion condensation gathers in the CEHB 190. To prevent damage from the condensation, the furnace 100 includes a condensation management system that includes the first and second drain hoses 151, 152, coupled to the CEHB 190. The condensation management system collects both the flue condensation and the combustion condensation at a single collection box, the CEHB 190, and provides a path to drain the condensation away from the furnace 100. The condensation management system advantageously employs a positive pressure at the flue pipe 148, a negative pressure at the CEHB 190 and the first and second drain hoses 151, 152, to direct the flue condensation to the CEHB 190. FIG. 2 and FIG. 3 provide a more detailed look at an embodiment of a collector box for the condensation management system. FIGS. 4, 5 and 6 illustrate an embodiment of a combustion management system, such as one that includes the first and second drain hoses 151, 152, and the CEHB 190, being used in different furnace positions.

FIG. 2 is a front isometric view of an embodiment of a collector box for a condensation management system constructed according to the principles of the disclosure. The collector box may be a CEHB such as the CEHB 190. As such, the illustrated collector box of FIG. 2 will be referred to hereinafter as the CEHB 190 of FIG. 1.

As noted above, the CEHB 190 provides an interface between the secondary heat exchanger 126 and the combustion air inducer 154 that draws combustion air through the heat exchanger 120. As such, the CEHB 190 is configured to provide an exit for the heated gas from the heat exchanger via the secondary heat exchanger 126. The CEHB 190 is also configured to remove the combustion condensation associated with the heated gas. Accordingly, the CEHB 190 is typically constructed of a non-metallic material that is resistive to water corrosion. The CEHB 190, for example, may be constructed of a plastic.

The CEHB 190 can be employed in a multi-position gas furnace such as the furnace 100. Accordingly, the CEHB 190 includes components of a multi-position drain system that includes a first drain port 210, a second drain port 212, a left drain 214 and a right drain 216. The first and second drain ports 210, 212, are positioned and configured to couple to drain hoses, such as drain hoses 151, 152, from the combustion flue collar 156 and allow drainage of exhaust condensation into the CEHB 190. The orifices of the first and second drain ports 210, 212, that receive drain hoses are configured to meter the amount of flue gas bypass back to the CEHB 190. The first and second drain ports 210, 212, therefore are configured to allow drainage into the CEHB 190 while reducing flue gas back to the CEHB 190. Depending on the installation of the furnace 100, the left drain 214, the right drain 216 or both the left and right drains 214, 216, may be used to remove condensation from the CEHB 190. As illustrated in FIG. 2, the first drain port 210 extends from the first drain 214 and the second drain port 212 extends from a front face of the CEHB 190.

Located on the four sides of the CEHB 190 is a flange 220 that is configured to attach the CEHB 190 to the secondary heat exchanger 126. The flange 220 includes holes, in which hole 222 is denoted, that are used to mechanically attach the CEHB 190 to the secondary heat exchanger 126. A gasket is typically used between the flange 220 and the secondary heat exchanger 126.

The CEHB 190 also includes a support collar 230 that is used to couple the combustion air inducer 154 to the CEHB 190. The support collar 230, therefore, corresponds to an inlet of the combustion air blower 154 for drawing air through the heat exchanger 120. The support collar 230 is configured to help support the combustion air inducer 154 in such a way that the inducer 154 requires only two screws compared to the traditional four screws needed to mount to the CEHB 190. A gasket denoted in FIG. 2 is typically used with the support collar 230 for coupling the CEHB 190 to the combustion air blower 154.

Located within the circumference of the support collar 230 (and therefore within the inlet of the combustion air blower 154) is a fixed orifice 240. The fixed orifice 240 is configured to regulate gas flow through the heat exchanger 120. The fixed orifice 240 may be sized based on an input size of the furnace 100. Also located within the circumference of the support collar 230 are a negative channel supply port 244 and a positive channel supply port 246. Each of these ports in the front face of the CEHB 190 provides an opening for supplying air to the respective channels. The size and location of the fixed orifice 240, the negative channel supply port 244, the positive channel supply port 246 and the size and location of positive and negative pressure channels 270, 280, (illustrated in FIG. 3) may be determined through empirical testing to provide a target pressure or pressure range as detected by a pressure sensing device for determining combustion pressure. The advantage of such an arrangement of the CEHB 190 is that a common pressure switch can be used for various input sizes of furnaces as well as provide a pressure signal that is suitable to a gas-air amplified gas valve to allow input rate modulation.

The CEHB 190 also includes a connection system 235 having alignment protrusions as denoted in FIG. 2 that are used to couple the pressure sensing device 195 to the CEHB 190. The connection system 235 and the corresponding protrusions may vary depending on the type or model of the pressure sensing device 195 to be attached to the CEHB 190.

The CEHB 190 further includes a positive pressure port 250 and a negative pressure port 260 that are coupled to a positive input and a negative input of a pressure sensing device, such as the pressure sensing device 195. The pressure sensing device is configured to monitor a combustion pressure across the fixed orifice 240 based on data received at the negative input port and the positive input port via the negative and positive pressure ports 250, 260. The positive and negative pressure ports 250, 260, are typically coupled to the pressure sensing device via pressure sensing device hoses. The positive pressure port 250 is located within the positive pressure channel 270 and the negative pressure port 260 is located within the negative pressure channel 280 as illustrated in FIG. 3. Locating the positive pressure port 250 and the negative pressure port 260 within the respective channels and away from openings of the respective channels protects the pressure ports and the pressure sensing device from condensation.

The CEHB 190 further includes a screw mounting lug 292 and a water dam 295. The screw mounting lug 292 is used when mounting a combustion air inducer to the CEHB 190. The water dam 295 is a condensate water dam that is configured to direct water away from sensitive areas of the CEHB 190 and assists in maintaining a stable pressure signal.

FIG. 3 is a rear isometric view of the CEHB 190 that illustrates the positive pressure channel 270 and the negative pressure channel 280. Though not visible in FIG. 3, the positive pressure channel 270 includes the positive pressure port 250. During normal operation, the positive pressure channel 270 has the same or about the same pressure as within the main cavity of the CEHB 190. As such, locating the positive pressure port 250 within the positive pressure channel 270 allows measuring of the combustion pressure while protecting the positive pressure port 250 from condensation. Other components of the positive pressure channel 270 and the negative pressure channel 280 that are not visible in FIG. 3 (or FIG. 2) include the negative channel supply port 244, the positive channel supply port 246 and an orifice located within the positive pressure channel 270 that is used to restrict a flow therethrough. Additionally, the negative pressure channel 280 includes bleed ports that are not visible in FIG. 2 or FIG. 3. The bleed ports are configured to reduce the pressure received through the negative channel supply port 244 to within a targeted range when measured at the negative pressure port 260. A size, configuration and location of the channels 270, 280, and the various components thereof may be determined through empirical testing to provide a target pressure or pressure range when detected by a pressure sensing device to correlate to a targeted pressure drop or flow thru the heat exchanger.

A first end of the positive pressure channel 270, an inlet end 272, extends within the support collar 230. A second end of the positive pressure channel 270, a pressure reference inlet 274, opens toward the side of the CEHB 190 having the first and second drains 214, 216. Furthermore, the open-ended pressure reference inlet 274 is located such that the collection of an undesired level of condensate within the CEHB 190 will cause the pressure within the positive pressure channel 270 to change. The monitoring of this change by the pressure sensing device 195 will allow the furnace to be shut down safely in response to the change. The positive pressure channel 270 has a quadrilateral cross section and includes four sections joined at or about 90 degrees to form a continuous open channel from the inlet end 272 to the pressure reference inlet 274.

Though not visible in FIG. 3, the negative pressure channel 280 includes the negative pressure port 260. The negative pressure channel 280 is configured to reduce the high negative pressure that is present at the inlet of the combustion air inducer 154 to a targeted pressure or pressure range at the negative pressure port 260. As such, locating the negative pressure port 260 within the negative pressure channel 280 allows measuring of the combustion pressure signal while protecting the negative pressure port 260 from condensation. The negative pressure channel 280 includes a first end denoted as a closed end 282. A second end of the negative pressure channel 280, an open end 284, opens toward the side of the CEHB 190 having the first and second drains 214, 216. Furthermore, the open end 284 is located such that the collection of an undesired level of condensate within the CEHB 190 will cause the pressure within the negative pressure channel 280 to change. The monitoring of this change by the pressure sensing device 195 will allow the furnace to be shut down safely in response to the change. The negative pressure channel 280 has a quadrilateral cross section and includes four sections that are joined to form a continuous open channel from the closed end 282 to the open end 284.

Located within a supply section 286 of the negative pressure channel 280 is the negative channel supply port 244. A portion of the supply section 286 including the negative channel supply port 244 is located within the circumference of the support collar 230 and, therefore, the corresponding inlet of the combustion air inducer 154. Sides of the negative pressure channel 280 around the open end 284 are shaped to provide a water shroud to protect the negative pressure port 260 from contamination.

The CEHB 190 has four sides coupled to a front face to form an open box. One side of the four sides is the upflow drainage side 320 that collects condensation and allows drainage of the condensation when the CEHB 190 is used in a furnace that is installed in an upflow position (e.g., see FIG. 4). Both the first and second drains 214, 216, are positioned proximate the upflow drainage side 320 of the CEHB 190 to allow drainage of condensation collected thereat. The first drain 214 is coupled to an opening of a horizontal left position side 330 of the CEHB 190 that collects condensation and allows drainage of the condensation when the CEHB 190 is used in a furnace that is installed in a horizontal left position (e.g., see FIG. 5). The second drain 216 is coupled to an opening of a horizontal right position side 340 of the CEHB 190 that collects condensation and allows drainage of the condensation when the CEHB 190 is used in a furnace that is installed in a horizontal right position (e.g., see FIG. 6).

FIG. 4 is a functional view of an embodiment of a condensation management system 400 constructed according to the principles of the disclosure. The condensation management system 400 is shown in the environment of a furnace in an upflow position. The condensation management system 400 includes a first drain hose 410, a second drain hose 420, and a CEHB 430. Components of the furnace are also illustrated including a flue pipe, a combustion air inducer, a pressure sensing device and hoses of the pressure sensing device.

The first and second drain hoses 410, 420, provide a drainage path for flue condensation from the flue pipe to the CEHB 420. The first and second drain hoses 410, 420, may be conventional hoses, pipes or conduits that used in furnaces to carry water. At the flue pipe end, the first and second drain hoses 410, 420, may be coupled to drainage export ports located in a collar of the flue pipe. At the CEHB end, the first and second drain hoses 410, 420, may be coupled to drainage ports of the CEHB 430.

The condensation management system 400 employs a positive pressure zone in the flue pipe to drive the flue condensation from the flue pipe, through the first and second drain hoses 410, 420, and to the CEHB 430 that has a negative pressure zone compared to the flue pipe. In the upflow position, both the first and second drain hoses 410, 420, can be used to drain the flue condensation. In addition to collecting the flue condensation, the CEHB 430 also collects combustion condensation from the furnace (e.g., the heat exchanger of the furnace). A first drain 434 and a second drain 438 of the CEHB 430 may be used to provide a drainage path from the CEHB 430. In one embodiment, either the first drain 434 or the second drain 438 is used for drainage and the other unused drain is plugged. The drainage export ports, the drain ports and the drains discussed with respect to FIG. 4 may be configured and constructed as the above described drainage export ports, drain ports and drains in FIGS. 1-3.

As illustrated in FIGS. 5 and 6, the condensation management system 400 advantageously provides condensation drainage in multiple furnace positions without requiring the rerouting of drain hoses or pressure sensing device hoses. In FIG. 5, the condensation management system 400 is used in a furnace installed at a horizontal left position. In the horizontal left position, the first drain hose 410 provides a single drainage path from the flue pipe to the CEHB 430. In this installation, the second drain 438 can be plugged.

In FIG. 6, the condensation management system 400 is used in a furnace installed at a horizontal right position. In the horizontal right position, the second drain hose 420 provides a single drainage path from the flue pipe to the CEHB 430. In this installation, the first drain 434 can be plugged.

Those skilled in the art to which this application relates will appreciate that other and further additions, deletions, substitutions and modifications may be made to the described embodiments.

What is claimed is:

1. A condensation management system for a furnace, comprising:
    a cold end header box comprising first and second drain ports;
    a first drain hose positioned to drain flue condensation from a flue pipe of said furnace directly to the first drain port of said cold end header box; and
    a second drain hose positioned to drain said flue condensation from said flue pipe directly to the second drain port of said cold end header box;
    wherein:
        said cold end header box is configured to collect both said flue condensation, from said first and second drain hoses, and combustion condensation, from a heat exchanger of said furnace,
        said cold end header box including first and second drains for draining both said flue condensation and said combustion condensation therefrom, wherein the first drain is operable in upflow and left horizontal positions and the second drain is operable in upflow and right horizontal positions, and wherein the first and second drains are operable to direct condensation in opposite directions;
        said first and second drain hoses extend from the flue pipe to a common edge of the cold end header box, the second drain hose angled diagonally away from the first drain hose; and
        the flue pipe is functional in upflow, left horizontal, and right horizontal positions.

2. The condensation management system as recited in claim 1 wherein said cold end header box includes two drains, wherein said two drains are positioned to allow drainage, of both said flue condensation and said combustion condensation, from said cold end header box through at least one of said two drains in multiple installation positions of said furnace.

3. The condensation management system as recited in claim 1 wherein both said first and said second drain hoses are positioned to drain said flue condensation when said furnace is installed in an upflow position.

4. The condensation management system as recited in claim 1 wherein only one of said first drain hose or said second drain hose is positioned to drain said flue condensation when said furnace is installed in a horizontal position.

5. The condensation management system as recited in claim 1 wherein said cold end header box includes a first and a second drain port, wherein said first drain hose is coupled to said first drain port and said second drain hose is coupled to said second drain port.

6. The condensation management system as recited in claim 5 wherein said first and said second drain ports include a flow restriction orifice configured to reduce gas from said flue from entering said cold end header box.

7. The condensation management system as recited in claim 5 wherein said first drain port extends from said first drain.

8. The condensation management system as recited in claim 5 wherein said second drain port extends from a front of said cold end header box.

9. The condensation management system as recited in claim 1 wherein said cold end header box includes positive and negative pressure channels, each pressure channel having an open end.

10. A furnace, comprising:
    a heat exchanger;
    a combustion air inducer configured to generate air flow through said heat exchanger;
    a flue pipe configured to vent gas from said furnace; and
    a condensation management system including:
        a cold end header box comprising first and second drain ports;
        a first drain hose positioned to drain flue condensation from said flue pipe directly to the first drain port of said cold end header box; and
        a second drain hose positioned to drain said flue condensation directly to the second drain port of said cold end header box;
        wherein:
            said cold end header box is configured to collect both said flue condensation, from said first and second drain hoses, and combustion condensation, from said heat exchanger,
            said cold end header box including first and second drains for draining both said flue condensation and said combustion condensation therefrom, wherein the first drain is operable in upflow and left horizontal positions and the second drain is operable in upflow and right horizontal positions, and wherein the first and second drains are operable to direct condensation in opposite directions;
            only one of said first drain hose or said second drain hose is positioned to drain said flue condensation when said furnace is installed in either horizontal position; and
            the flue pipe is functional in upflow, left horizontal, and right horizontal positions.

11. The furnace as recited in claim 10 wherein said cold end header box includes only two drains, wherein said two drains are positioned to allow drainage, of both said flue condensation and said combustion condensation, from said cold end header box through at least one of said two drains in multiple installation positions of said furnace.

12. The furnace as recited in claim 10 wherein both said first and said second drain hoses are positioned to drain said flue condensation when said furnace is installed in an upflow position.

13. The furnace as recited in claim 10 wherein said cold end header box includes positive and negative pressure channels, each pressure channel having an open end.

14. The furnace as recited in claim 10 wherein said cold end header box includes a first and a second drain port, wherein said first drain hose is coupled to said first drain port and said second drain hose is coupled to said second drain port.

15. The furnace as recited in claim 14 wherein said first and said second drain ports include a flow restriction orifice configured to reduce gas from said flue from entering said cold end header box.

16. The furnace as recited in claim 14 wherein said first drain port extends from said first drain.

17. The furnace as recited in claim 14 wherein said second drain port extends from a front of said cold end header box.

18. The furnace as recited in claim 10 further comprising a flue collar coupled to said flue pipe and including drainage export ports couplable to said first and second drain hoses.

19. A cold end header box for use with a furnace, comprising:
- a front having a support collar operable to support a combustion air inducer, the support collar surrounding a negative channel supply port, a positive channel supply port, and a fixed orifice configured to regulate gas flow through a heat exchanger of said furnace, the front further comprising a negative pressure port and a positive pressure port, said front coupled to first, second, third and fourth sides that extend from said front in a first direction;
- a first drain coupled to said first side at an opening thereof located proximate said second side, said first drain extending from said first side along an axis parallel with said second and third sides;
- a second drain coupled to said fourth side at an opening thereof located proximate said second side, said second drain extending from said fourth side along said axis parallel with said second and third sides;
- a first drain port coupled to said front proximate said second side;
- a second drain port coupled to said first drain, wherein said first drain port and said second drain port extend in a second direction that is generally opposite said first direction and are positioned to receive flue condensation directly from a flue pipe of said furnace; and
- a back opposing the front and comprising;
  - a positive pressure channel comprising an inlet end coupled to the positive channel supply port and further comprising a pressure reference inlet end, the positive pressure channel coupled to the positive pressure port, wherein the pressure reference inlet end is located such that the collection of a first undesired level of condensate within the closed end header box will cause a pressure change in the positive pressure channel; and
  - a negative pressure channel comprising a closed end coupled to the negative channel supply port and further comprising an open end, the negative pressure channel coupled to the negative pressure port, wherein the open end is located such that the collection of a second undesired level of condensate within the closed end header box will cause a pressure change in the negative pressure channel.

\* \* \* \* \*